Sept. 1, 1925.
F. B. YINGLING
CUT METER
Filed March 19, 1921   3 Sheets-Sheet 1
1,551,860
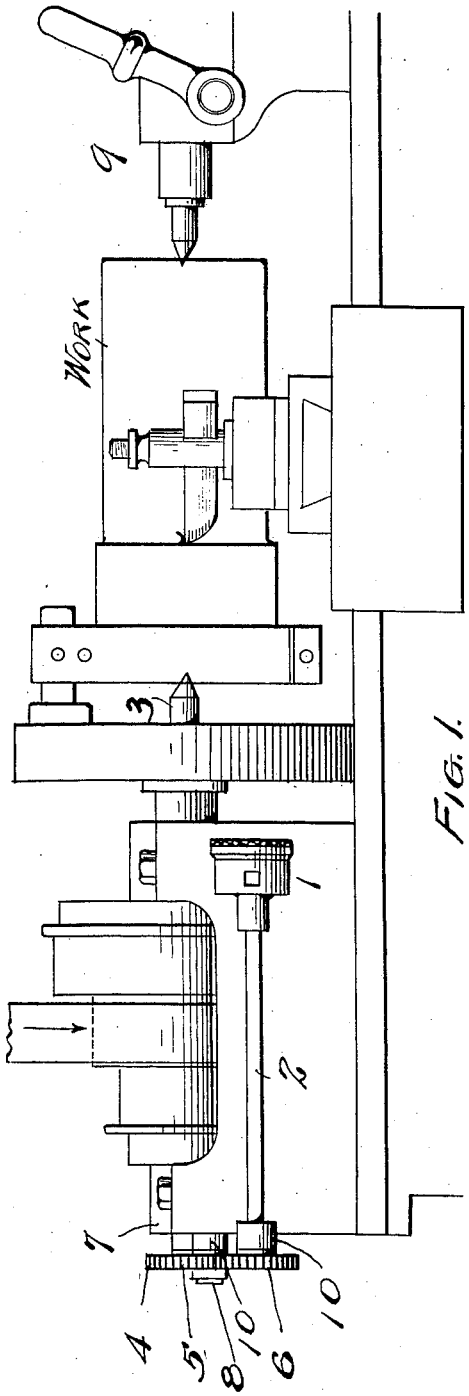
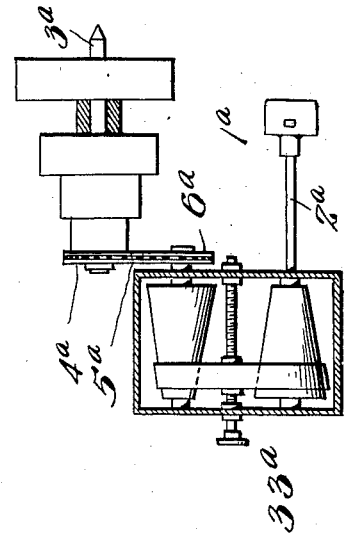
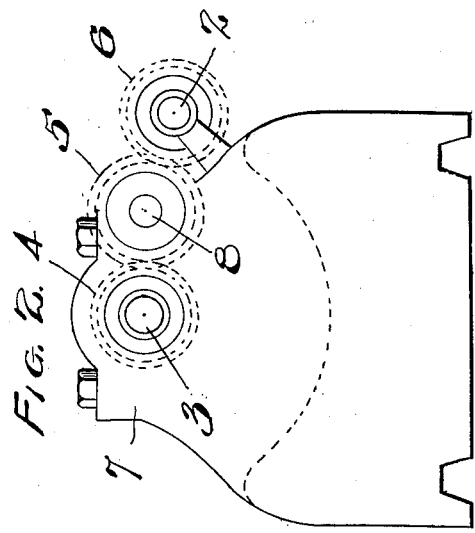
Inventor
F. B. YINGLING
Fenelon B. Brock
Attorney Sept. 1, 1925.
F. B. YINGLING
CUT METER
Filed March 19, 1921 3 Sheets-Sheet 2
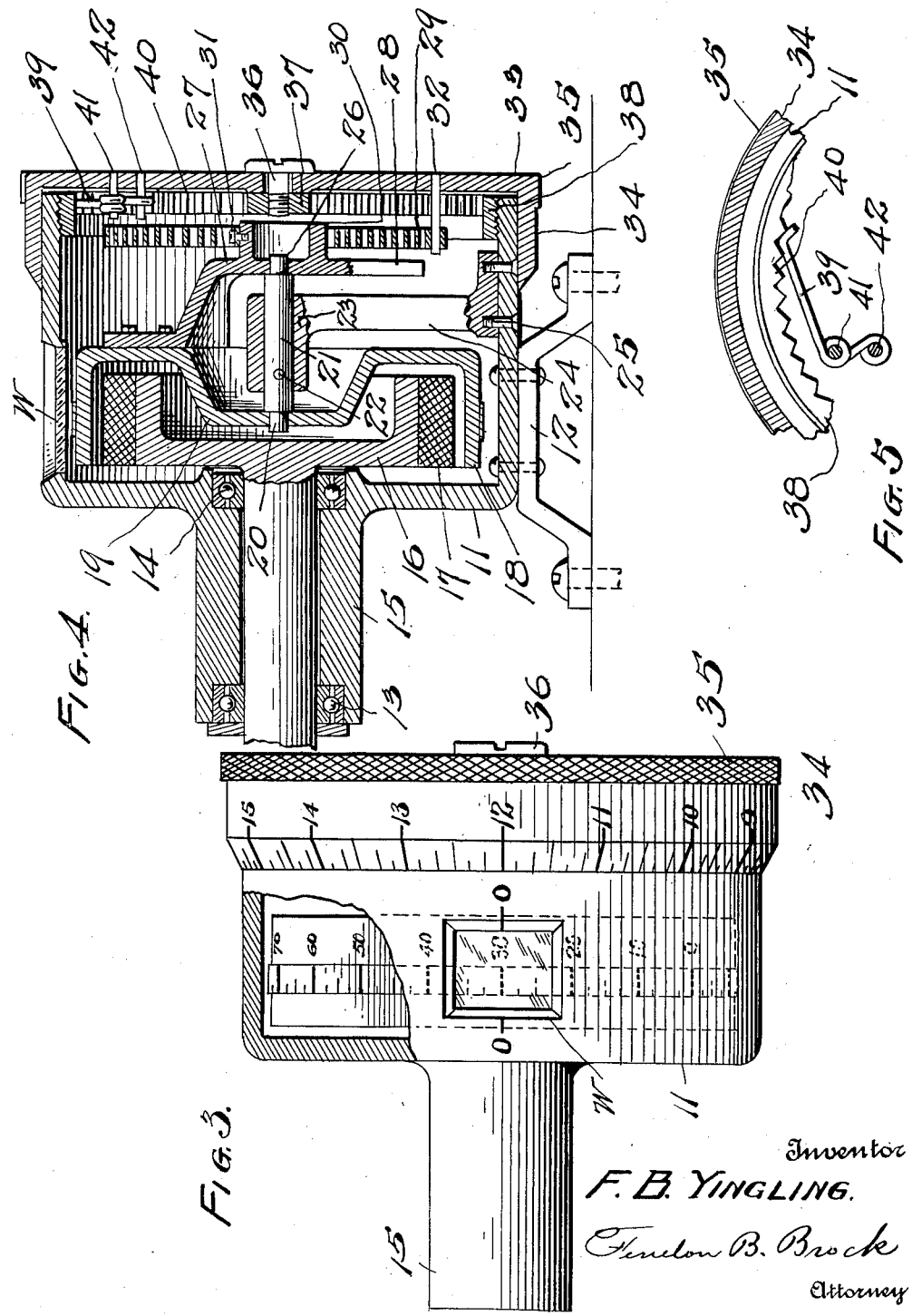

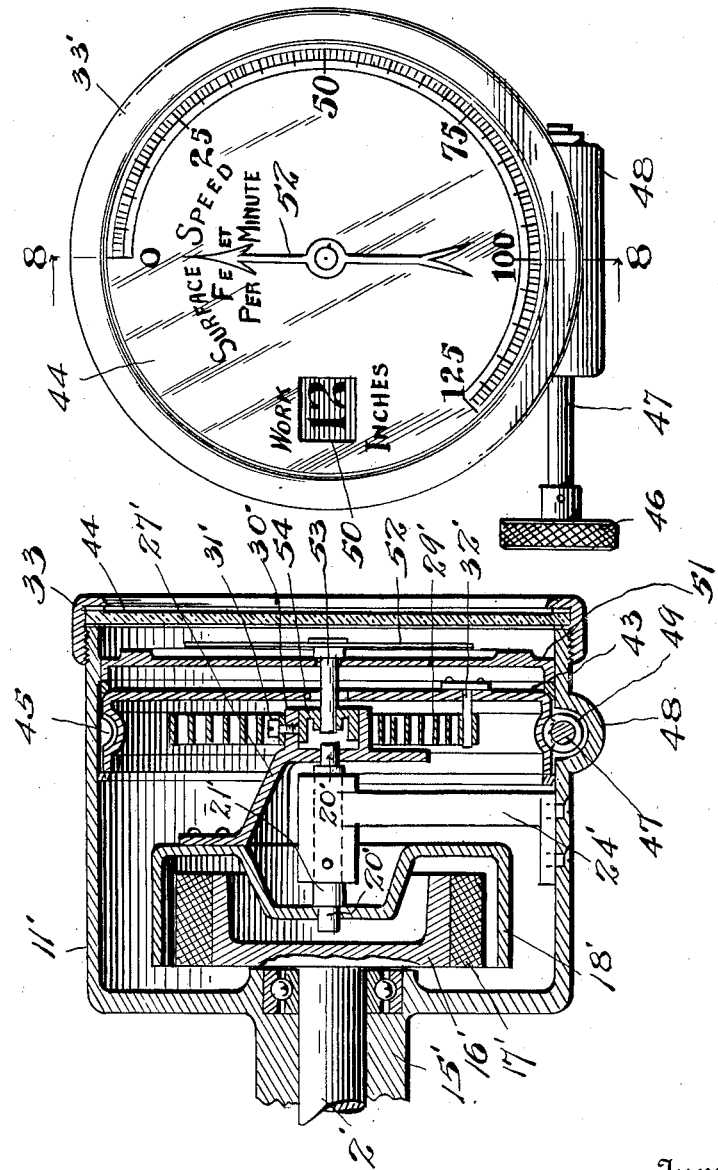

Patented Sept. 1, 1925.

1,551,860

UNITED STATES PATENT OFFICE.

FRANK B. YINGLING, OF HAMILTON, OHIO.

CUT METER.

Application filed March 19, 1921. Serial No. 453,699.

*To all whom it may concern:*

Be it known that I, FRANK B. YINGLING, a citizen of the United States, residing at Hamilton, in the county of Butler and State of Ohio, have invented a new and useful Cut Meter, of which the following is a specification.

My invention relates particularly to improvements in cut meters of the speed responsive type, which may involve a magnetic drag, for combined use, especially in connection with lathes, drill presses, milling machines, and other similar machines, for indicating on the cut meter the cutting speed per minute in proportion to the speed of the work on the machine, and also in proportion to the diameter of the work.

By the utilization of my invention in cooperation with a lathe, for instance, I am enabled to set or adjust the instrument according to the known diameter of the work and hardness of material and also to indicate on the meter a desired and predetermined number of cutting feet per minute of the lathe spindle or work, thus providing the lathe with a device for accurately and positively indicating the continued operation of the lathe, in order that the predetermined cutting feet per minute of the lathe may be uniformly maintained on a specific piece of work.

To this end the invention consists in the combination with a machine as described of a cut meter and indicator and in certain novel combinations and arrangements of parts as will be hereinafter more fully described and claimed.

In the accompanying drawings I have illustrated one complete example, and a modification thereof, of the physical embodiment of my invention in connection with a lathe of standard type, wherein the parts are combined and arranged according to the best modes I have thus far devised for the practical application of the principles of my invention. While the invention is illustrated and will be described, as an exemplification, in combination with a lathe, it will be understood that changes and modifications, and adaptations may be instituted within the scope of my claims, without departing from the spirit of my invention.

Figure 1 is a view in side elevation of so much of a lathe of well known type, as is necessary to illustrate the application thereto of my invention.

Figure 2 is a diagrammatic view at the end of the lathe of Figure 1, showing the head stock, and relation of the lathe spindle to the meter shaft.

Figure 3 is a side view of the meter, enlarged, and broken away for convenience of illustration, as adapted for use with a machine tool, showing the graduations and method of using the meter.

Figure 4 is a longitudinal sectional view of the meter, disclosing the arrangement of the interior parts thereof, especially for varying the tension of the operating spring of the meter, and co-acting parts.

Figure 5 is a detail sectional view illustrating the action of the spring detent for the adjusting head of the meter.

Figure 6 is a diagrammatic view showing a modification of the invention as utilized with a variable speed mechanism in place of the adjustable head of the meter.

Figure 7 is a face view of a magnetic indicator, using flat scales, and modified means for adjusting the tension of the spring of the diameter scale, and Figure 8 is a section on line 8—8 thereof.

In Figure 1 of the drawings I have illustrated a meter designated as a whole by the numeral 1, combined with a lathe and arranged in such relation thereto that the meter shaft 2 is revolved in synchronism with the lathe spindle 3 and its work, through the gear set or train of gears 4, 5, and 6, indicated by dotted lines in Figure 2. In the latter figure the drive gear 4 is shown at the end of the head stock 7 of the lathe, and the idler pinion 5 on its shaft 8 is designed to fill the space between the parallel spindle and meter shaft and transmit power to rotate the drive gear 6. Through the gear 6 the meter shaft, which is also an armature shaft, is thus rotated in the same direction as the spindle of the lathe and its work, and at the same identical speed. The usual tail stock is designated at 9 in Figure 1, and bearings 10 are provided on the lathe for the shafts 2 and 8, the spindle being journaled as usual in the headstock.

The ratio of speed of the spindle 3 of the lathe and shaft 2 of the cut meter, is thus fixed, as an illustration, at 1 to 1, but it will be understood that this ratio may be varied when desired, as for instance the ratio may be 1 to 2 or 1 to 3, or more being adopted with due proportions to the graduated scale of the meter and tension or torque spring thereof, as will be described.

The body or casing 11 of the meter is a metallic, cylindrical cup having a securing or attaching bracket 12 fixed to a part of the lathe as a rigid support in accessible position where the meter may be consulted from time to time to ascertain the operation of the machine or lathe. Preferably the meter shaft is journaled in anti-friction bearings indicated at 13 and 14 in Figure 4 within the elongated bushing or hub 15 of the meter body or housing 11.

At its end, as shown in Figure 4, the meter shaft is fashioned with an integral disk 16 having a peripheral flange, and upon the exterior of the flanged disk magnetic elements or coils 17 are utilized to form an armature or rotor continuously revolvable with the meter shaft, which thus becomes also an armature shaft. In combination with the armature, I utilize a speed indicating drum 18, which is responsive to the speed of the armature and shaft, and thus forms a magnetic drag within the housing of the meter. This open end drum is preferably of comparatively thin metal and light in weight, and provided with a central bearing boss 19 projected within the flanged disk of the armature. The drum is rotatable in response to the magnetic drag or speed drive of the armature, on the journal 20 of the fixed axle 21.

The axle is secured and rigidly held, as by a pin 22 in the bracket head 23 of the bracket arm 24, which latter is attached, as at 25, to the inner surface of the cylindrical wall of the housing or cup 11. The drum is oscillatable on its bearing, and its movement is stabilized by an additional bearing 26 at the opposite end of the axle 21 for the bracket arm 27 attached to the drum. The drum is thus journaled on two stationary bearings spaced apart to afford a wide and stable support, and the bracket 27 on the drum has an extension 28 thereon to form a counterweight as an additional stabilizing element for the drum when acted on in response to the speed of the meter shaft and its armature.

The drum is free to revolve under the magnetic influence of the armature, through an arc of approximately 300 degrees, in the direction of the rotation of meter shaft 2, but is retarded in its rotation by the tension of a torque spring 29 in the housing of the meter. The spring is coiled about a boss 30 of the drum bracket 27, the inner end of the spring being anchored to the boss as by a screw 31. The outer end of the spring is attached to a pin 32, fixed in the circumferentially adjustable meter head 33, which head is provided with a flange 34, and knurled ring 35 as shown. The flange makes a neat fit over the open end of the meter housing, and the knurled head, which may be grasped by hand and turned for adjustment, may be rotated on the central retaining screw 36. The retaining screw is threaded into the central hub 37 of a spider frame, which is fashioned with an externally threaded ring 38 adapted to screw into a complementarily threaded opening of the housing. Thus the fixed spider frame and retaining screw 36 afford a support for the oscillation of the adjusting head in setting the meter. In Figure 5 a spring detent 39 is shown in engagement with the annular series of rack teeth 40 formed on the inner periphery of the ring 38, to hold the head in adjusted position. The detent is carried by the head on a pair of anchoring pins 41 and 42 fixed in the head and projecting into the housing through the spider frame, and it will be apparent that the function of the spring detent is to frictionally engage the annular rack of the ring, to permit forcible rotation of the head against tension of the spring detent, but to hold the head in adjusted position when force is released from the head.

The magnetic drum or indicator is equipped with an indicating scale, as seen through the glass window W, in Figure 3, with graduations reading from 0 to say 100 or possibly 150, to correspond with the cutting speed in feet per minute of the work, and the flange of the adjustable head has a complementary scale with graduations corresponding in inches to the diameter in inches of the work, the range of the scale on the head being sufficient to adapt the meter for various diameters of work. Thus assuming the meter to be in use on a lathe of 24 inches swing, the reading of the scale on the head would be from 0 to 24 inches and similarly the scale may be varied to suit the capacity of a drilling machine. When in use on a milling machine, for instance, the graduations of the head scale could be from 0 to 8 inches or 10 inches, or the maximum size of the cutters used on the machine.

In actual practice it is customary to use a speed of from 15 feet to approximately 50 feet per minute for steel ranging from the grade of tool steel to a mild steel. For cast iron the cutting speeds may range from 30 feet to 60 feet per minute, and for brass the cutting speed again varies between 60 feet and 100 feet or more depending upon the hardness of the material.

Thus a scale on the drum ranging from 0 to 100 feet per minute should be sufficient to meet the demands for speeds in cutting the different materials and different grades of materials in the average machine shop.

Now assuming the meter of the invention to be used in connection with a lathe as shown in Figure 1, wherein the diameter of the work is 12 inches of medium hard steel, forging or casting, and the meter shaft is geared to rotate at the same speed as the spindle. The adjusting head is turned to position in Figure 3 with the number 12 (indicating a diameter of 12 inches for the work) registering with the 0 markings on the body of the meter. A predetermined cutting speed of 30 feet per minute has been adopted, and after starting the lathe, the speed of the lathe is increased until the indicating drum is rotated in response to the speed of the spindle and meter shaft, and magnetic drag of the armature, bringing the number 30 to register with the number 12 as in Figure 3. The continued operation of the lathe now maintains the drum in its proper relation with the adjusted head, and any variation in speed of the lathe will be indicated by the changed relation of the scales on the drum and head.

Should the 12 inches work be of soft material, as cast iron on which a cutting speed of 60 feet per minute is adaptable, the lathe may be increased in its speed to revolve the drum sufficiently to bring the number 60 to register with 12 in Figure 3. Upon work of 6 inches diameter comprising hard steel, I may use a cutting speed of 15 feet per minute, and the lathe is reduced to this speed with a corresponding change in the relation of the drum to the adjusting head.

In operation, the magnetic drag of the armature reacts on the drum to swing the latter, in response to the speed of the shaft 2 as operated from the spindle in the same direction as the rotation of the armature, but the tendency to rotate by the drum is resisted by the tension of the torque spring 29. The resistance exerted by the spring on the drum is determined by the location of the adjustable head 33 with relation to the graduated scale on the meter housing. Therefore the deflection or rotation of the drum in response to the speed of the armature shaft and armature, or magnetic drag, is determined by the rotation of the magnet and the tension of the torque spring as varied by the position of the adjustable head.

Various modifications may be made in the invention as illustrated, as for instance the train of gears from the spindle to the meter shaft, may be replaced by a sprocket drive mechanism as shown in Figure 6. In this figure the spindle 3$^a$ actuates the sprocket driving mechanism comprising the wheel 4$^a$, chain 5$^a$ and driven wheel 6$^a$. The meter 1$^a$ is modified by the omission of the adjustable head, and the latter is replaced by a variable speed mechanism of the friction type, indicated as 33$^a$ to transmit motion from the spindle to the meter shaft. Here the variation in the speed of the cut meter is accomplished by changing the position of the friction belt between the two cone pulleys, in proportion to the diameter of the work.

In the modified form of my invention in Figures 7 and 8 I utilize a worm screw adjustment for the diameter scale, and both the diameter and surface speed of the work are indicated on flat scales, the latter being indicated by a needle or pointer.

In this form of the invention the meter is designated by the numeral 1', and the meter shaft as 2' while the casing 11', hub 15', flanged disk 16' and coils 17' are substantially the same as the construction shown in Figures 3 and 4, with slight modifications hereinafter referred to. The drum 18' performs its functions, and is rotatable in response to the magnetic drag of the armature of the shaft 2', but the speed scale is removed therefrom.

The two journal bearings 20' of the axle 21', which is fixed in the bracket 24', support the drum and its bracket 27', and the coiled tension spring 29' is fixed at its inner end to the boss 30' of the drum-bracket, by screw 31', while its outer end is attached to a worm wheel 43, which is adjustable to regulate and control the tension of the spring 29', and for properly locating the work-diameter figures or scale, as seen at 12 through the glass plate 44.

The glass panel or plate is retained over the open end of the casing by the annular head, or threaded, flanged ring 33', suitable gaskets being employed for packing, as indicated.

The worm wheel is in the form of a flanged cup or drum with an annular, external, series of teeth 45, and is rotatably retained in the casing in suitable manner, for movement and actuation by turning the hand wheel 46 of the worm shaft 47, arranged tangentially to the worm wheel and journaled in a housing 48 at the lower side of the casing. In Figure 8 it will be seen that the screw or worm 49 on the worm shaft is in direct mesh with the external teeth of the worm wheel, and by turning the hand wheel to the left or right the action of the worm and wheel increases or decreases the tension of the spring 29' with resulting effect on the drum 18'.

The scale for indicating the diameter of the work in inches, as shown in Figure 7, is applied to the outer flat face of the drum wheel, and one of the annular series of figures (12) of the scale is visible through the glass plate, and through an opening provided for the purpose at 50 in the fixed disk 51. This disk is suitably retained in the casing and bears the scale indicating the surface speed feet per minute of the work, the scale ranging from 0 to 125 as seen in Figure 7, and a needle or pointer 52, within the glass inclosure, co-acts with the scale for indicating the speed of the work. The needle is carried on its shaft 53 extending through the disk 51 and through the open center of the worm wheel, and its hub 54 is fixed within the boss 30' of the bracket 27 of the drum 18'.

When the drum 18' is moved in response to the magnetic drag of the armature 17', the needle is turned in connection therewith to indicate on the scale, the surface speed per minute of the work.

By the use of the term machine tool in the specification and claims, I do not intend to limit the disclosure of the invention to metal working machinery as described, for it will readily be apparent that the instrument is adapted for use with other machinery, and in such other installations the graduations of the scales will be used in terms or indications complementary to the utility of the machinery.

What I claim is—

1. The combination with a machine tool and its revolving work holder, of a driven member including indicating means responsive to the speed of the holder and its work, and adjustable means co-acting with the driven member adjusted to correspond to the diameter of the work for varying the movement of the driven member in proportion to the diameter of the work.

2. The combination with a revolving work holder, of a meter including indicating means responsive to the speed of the work holder, and adjustable means for varying the movement of the driven member in proportion to the diameter of the work carried by the holder.

3. The combination with a revolving work holder, of a meter including a rotatable indicating drag member responsive to the speed of the work holder, and an adjustable head on the meter operatively connected with the drag member having a scale corresponding to the diameter of the work carried by the holder.

4. The combination with a revolving work holder, of a meter including a rotatable indicating drag member responsive to the speed of the work holder, an adjustable head on the meter having a scale corresponding to the diameter of the work on the holder, and a variable tension device connecting said drag member and head.

5. The combination with a revolving work holder, of a meter includng a rotatable indicating drag member responsive to the speed of the work holder, an adjustable head on the meter having a scale corresponding to the diameter of the work of the holder, a torque spring connecting said drag member and head, and means for normally retaining said head in adjusted position.

6. In a cut meter the combination with rotary driving means, of a rotatable speed indicating drag member responsive to the speed of the driving means, an adjustable head having a scale and co-acting with the indicating drag member, and a variable tension retarding element between said drag member and head.

7. In a cut meter the combination with rotary driving means, of a rotatable speed-indicating drag member responsive to the speed of the driving means, an adjustable head having a scale and co-acting with the indicating drag member, a variable tension retarding element between said drag member and head, a rack on the meter, and a spring detent on the head for retaining the latter in normal adjusted position.

8. The combination with a cut meter having an armature shaft and armature and an axle supported in the meter, of an indicating drag member journaled on said axle and responsive to the magnetic influence of said armature, an adjustable head having a scale co-acting with the indicating drag member, means for normally retaining said head in adjusted position with relation to the drag member, a bracket on the drag member journaled on said axle, and a torque spring attached to said bracket and head.

9. The combination with a cut meter having an armature shaft and armature and an axle supported in the meter, of an indicating drag member journaled on the axle and responsive to the magnetic influence of the armature, an adjustable head having a scale co-acting with the indicating drag member, a rack on the meter and a spring detent on the head for retaining the latter in adjusted position, and a variable tension element between said drag member and head.

10. The combination with revolving work, of a cut meter including an indicating member and means for bringing said member into equilibrium with said work, said means actuated by connections from the work in proportional ratio to the rotation of the work acting against a force in inverse proportional ratio to the diameter of said work for indicating the surface speed of the revolving work.

11. In a cut meter the combination with rotary driving means, of a rotatable member with indicating scale responsive to the speed of the driving means, an adjustable member having a scale co-acting with the indicating scale, and means for providing a variable tension-retarding action between said scales for the purpose described.

FRANK B. YINGLING.